United States Patent
Elliott et al.

(10) Patent No.: US 10,711,623 B1
(45) Date of Patent: Jul. 14, 2020

(54) GAS TURBINE ENGINE AIRFOIL FREQUENCY DESIGN

(71) Applicant: UNITED TECHNOLOGIES CORPORATION, Farmington, CT (US)

(72) Inventors: Jason Elliott, Huntington, IN (US); Daniel C. Falk, Middletown, CT (US); Myron L. Klein, Higganum, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 251 days.

(21) Appl. No.: 15/872,196

(22) Filed: Jan. 16, 2018

Related U.S. Application Data

(60) Provisional application No. 62/446,980, filed on Jan. 17, 2017.

(51) Int. Cl.
*F01D 5/16* (2006.01)
*F01D 5/26* (2006.01)
*F01D 5/28* (2006.01)
*F01D 25/06* (2006.01)
*F02K 3/06* (2006.01)

(52) U.S. Cl.
CPC ............ *F01D 5/26* (2013.01); *F01D 5/16* (2013.01); *F01D 5/28* (2013.01); *F01D 25/06* (2013.01); *F02K 3/06* (2013.01); *F05D 2220/323* (2013.01); *F05D 2220/3212* (2013.01); *F05D 2230/00* (2013.01); *F05D 2240/24* (2013.01); *F05D 2260/96* (2013.01); *F05D 2300/173* (2013.01); *F05D 2300/174* (2013.01)

(58) Field of Classification Search
CPC ..... F01D 5/26; F01D 5/16; F01D 5/28; F01D 25/06; F02K 3/06
USPC .......................................................... 415/119
See application file for complete search history.

(56) References Cited

U.S. PATENT DOCUMENTS

| | | | | |
|---|---|---|---|---|
| 4,839,245 A | * | 6/1989 | Sue | C23C 14/0021 29/DIG. 45 |
| 5,988,982 A | * | 11/1999 | Clauer | C21D 10/005 219/121.62 |
| 6,033,186 A | * | 3/2000 | Schilling | B63H 1/26 416/233 |
| 9,051,877 B2 | * | 6/2015 | Sabnis | F02C 3/08 |
| 9,394,793 B1 | | 7/2016 | Atkins et al. | |
| 2016/0208741 A1 | * | 7/2016 | Sabnis | F02K 3/06 |
| 2016/0222978 A1 | * | 8/2016 | Drozdenko | F01D 5/147 |

(Continued)

OTHER PUBLICATIONS

FAA Advisory Circular 33.83A (Year: 2006).*

*Primary Examiner* — Justin D Seabe
*Assistant Examiner* — Andrew J Marien
(74) *Attorney, Agent, or Firm* — Carlson, Gaskey & Olds, P.C.

(57) ABSTRACT

In one exemplary embodiment, a turbofan engine comprises a fan section. A core section includes a turbine section arranged fluidly downstream from the compressor section. A combustor is arranged fluidly between the compressor and turbine sections. The fan and core sections are configured to produce a thrust in a range 27,000-35,000 pounds-f (120, 102-156,688 N). An airfoil is arranged in the fan section. The airfoil has first and second modes each having a frequency. The first mode has the lowest frequency, and the second mode has the second lowest frequency wherein the second mode frequency is 140 Hz or less at a redline engine speed.

13 Claims, 3 Drawing Sheets

(56) References Cited

U.S. PATENT DOCUMENTS

| | | | |
|---|---|---|---|
| 2016/0363047 A1* | 12/2016 | Schwarz | F01D 5/14 |
| 2018/0230825 A1* | 8/2018 | Gimat | C09J 5/00 |
| 2018/0230912 A1* | 8/2018 | Hasel | F02K 3/06 |
| 2018/0274558 A1* | 9/2018 | Theratil | F04D 29/327 |
| 2019/0085771 A1* | 3/2019 | Schwarz | F02C 7/36 |

* cited by examiner (EB1 MODE)

(T MODE)

(SWB1 MODE)

(EB1 MODE)

(T MODE)

(SWB1 MODE)

(EB1 MODE)

(EB2 MODE)

(EB3 MODE)

US 10,711,623 B1

GAS TURBINE ENGINE AIRFOIL FREQUENCY DESIGN

CROSS-REFERENCE TO RELATED APPLICATIONS

This disclosure claims priority to U.S. Provisional Patent Application No. 62/446,980 filed Jan. 17, 2017.

BACKGROUND

The disclosure relates to turbomachinery. More particularly, the disclosure relates to gas turbine engine airfoils and their designed vibrational responses.

Airfoils of turbine engine blades and vanes are subject to a number of performance-affecting conditions. The airfoils are subject to environmental exposure and thermal and mechanical loading. These factors are significant in each section of the engine for a variety of reasons. For example, in the fan section of high bypass engines, the airfoils have a large diameter with a relatively small thickness. For blades, rotational forces are also a significant dynamic stimulus.

Vibrational responses of the airfoil can provide an indication of how durable the airfoil will be during engine operation. If an airfoil operates too long at a resonant frequency during engine operation, the life of the airfoil may be significantly shortened as the airfoil is more highly stressed. An exemplary vibrational testing method is defined in United States Federal Aviation Administration (FAA) Advisory Circular 38.83-1 (Sep. 8, 2009). Designing airfoils with desirable resonant frequencies can prolong the useful life of engine components, particularly the airfoil itself.

SUMMARY

In one exemplary embodiment, a turbofan engine comprises a fan section. A core section includes a a turbine section arranged fluidly downstream from the compressor section. A combustor is arranged fluidly between the compressor and turbine sections. The fan and core sections are configured to produce a thrust in a range 27,000-35,000 pounds-f (120,102-156,688 N). An airfoil is arranged in the fan section. The airfoil has first and second modes each having a frequency. The first mode has the lowest frequency, and the second mode has the second lowest frequency wherein the second mode frequency is 140 Hz or less at a redline engine speed.

In a further embodiment of the above, the fan section includes a hub, and the airfoil is mounted on the hub, and the hub and the airfoil provide the first and second modes.

In a further embodiment of any of the above, the airfoils is fixedly supported in the hub in a dovetail arrangement.

In a further embodiment of any of the above, the fan section has a circumferential array of the airfoils, the array providing a fan diameter in a range of 77-85 inches (1.8-2.2 m).

In a further embodiment of any of the above, the second mode has an easywise bending component.

In a further embodiment of any of the above, a gear train rotationally couples the turbine section and the fan section. The compressor section is arranged fluidly downstream from the fan section In a further embodiment of any of the above, the airfoil comprises an aluminum-based alloy with a density of about 0.103 lb/in3 (2.85 g/cm3) and with a modulus of elasticity of about 10.4 Mpsi (71 GPa) at room temperature.

In a further embodiment of any of the above, the airfoil includes an aluminum-based alloy blade body with a titanium-based alloy sheath at a leading edge on the airfoil body.

In a further embodiment of any of the above, the airfoil comprises an titanium-based alloy with a density of about 0.16 lb/in3 (4.4 g/cm3) and with a modulus of elasticity of about 16-17 Mpsi (110-117 GPa) at room temperature.

In a further embodiment of any of the above, the airfoil comprises a composite material.

In a further embodiment of any of the above, the second mode frequency is in a range of 100-140 Hz.

In a further embodiment of any of the above, the second mode frequency is in a range of 100-120 Hz.

In a further embodiment of any of the above, the second mode frequency is in a range of 100-110 Hz.

In a further embodiment of any of the above, the second mode frequency is in a range of 110-120 Hz.

In a further embodiment of any of the above, the second mode frequency is in a range of 120-140 Hz.

In a further embodiment of any of the above, the second mode frequency is in a range of 120-130 Hz.

In a further embodiment of any of the above, the second mode frequency is in a range of 130-140 Hz.

In another exemplary embodiment, a turbomachine airfoil is configured to be mounted on a hub in a fan section of a turbomachine and is configured to produce a thrust in a range 27,000-35,000 pounds-f (120,102-156,688 N). The fan section has a circumferential array of the airfoils, and the array provides a fan diameter in a range of 77-85 inches (1.8-2.2 m). The airfoil comprises first and second modes each having a frequency. The first mode has the lowest frequency, and the second mode has the second lowest frequency wherein the second mode frequency is 140 Hz or less at a redline speed and an engine operating temperature at a cruising altitude.

In a further embodiment of the above, the second mode has an easywise bending component.

In a further embodiment of any of the above, the second mode frequency is in a range of 100-140 Hz.

BRIEF DESCRIPTION OF THE DRAWINGS

The disclosure can be further understood by reference to the following detailed description when considered in connection with the accompanying drawings wherein.

DETAILED DESCRIPTION

Figures 1, 2:
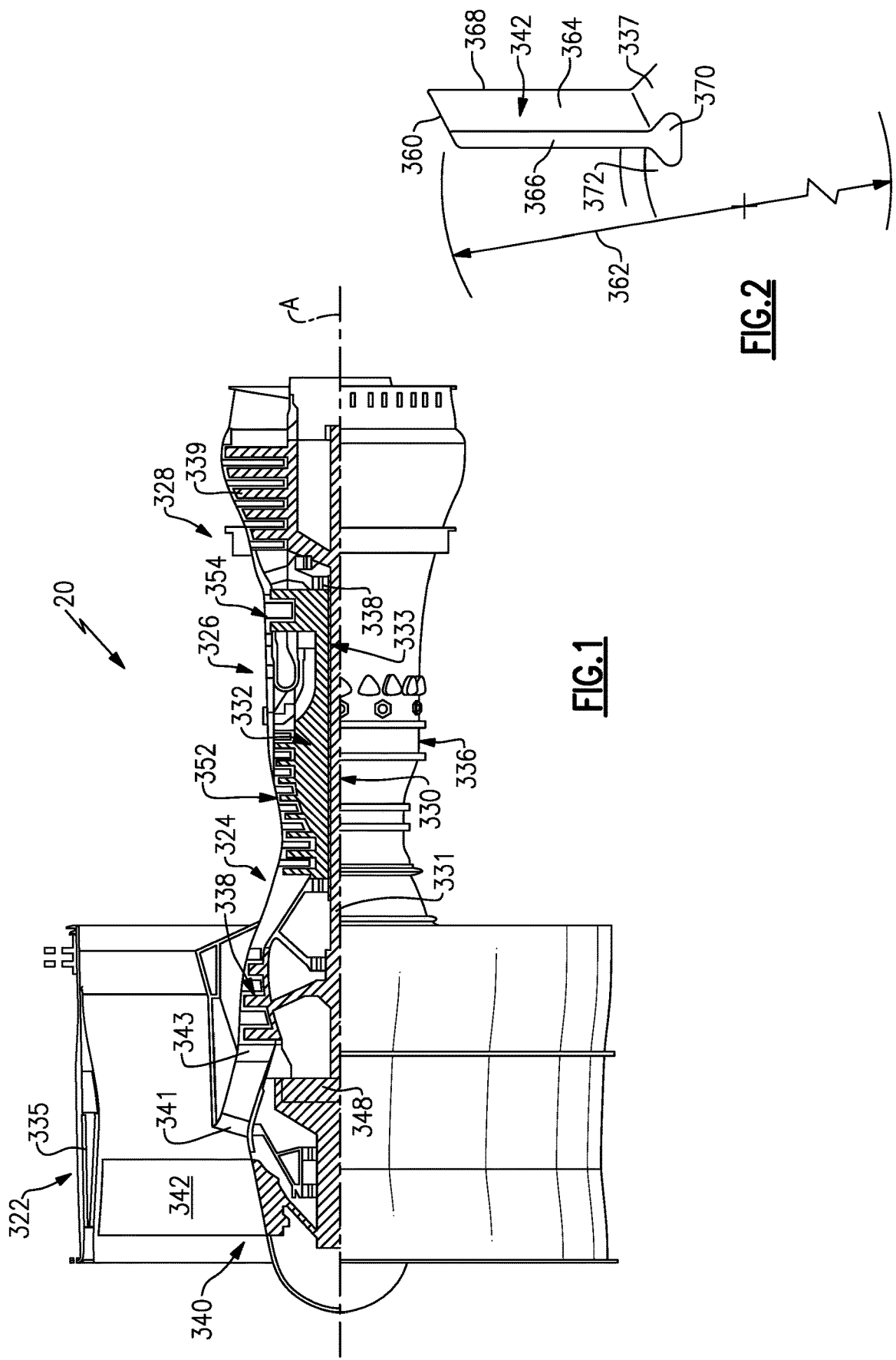
FIG. 1 is a schematic sectional view of a turbofan engine.
FIG. 2 is a schematic perspective view of an example fan blade and a portion of a fan hub.

FIG. 1 schematically illustrates a gas turbine engine 320. The exemplary gas turbine engine 320 is a two-spool turbofan engine that generally incorporates a fan section 322, a compressor section 324, a combustor section 326 and a turbine section 328. Alternative engines might include an augmenter section (not shown) among other systems or features. The fan section 322 drives an inlet airflow to split with a bypass portion being driven along an outboard bypass flow path, while the core portion is further driven by a compressor section 324 along a core flow path for compression and communication into the combustor section 326. The hot combustion gases generated in the combustor section 326 are expanded through the turbine section 328. Although depicted as a turbofan gas turbine engine in the disclosed non-limiting embodiment, it should be understood that the concepts described herein are not limited to turbofan engines and these teachings could extend to other types of engines, including but not limited to, geared turbine engines having a geared architecture 348, three-spool engine architectures, and ground-based engines.

The exemplary fan section comprises a fan case 335 surrounding a fan 340 which comprises a circumferential array of fan blades 342. In the exemplary two-spool engine, the low pressure spool 330 comprises a shaft 331 rotatable about axis A joining a first (or low) pressure compressor (LPC) section 338 to a first (or low) pressure turbine (LPT) section 339. Similarly, a second (or high) speed spool 332 comprises a shaft 333 rotatable about axis A coupling a second (or high) pressure compressor section 352 to the high pressure turbine section 354.

The core airflow is compressed by the low pressure compressor 338 then the high pressure compressor 352, mixed and burned with fuel in the combustor 326, then expanded over the high pressure turbine 354 and low pressure turbine 339. The turbines 354, 339 rotationally drive the respective low speed spool 330 and high speed spool 332 in response to the expansion. It will be appreciated that each of the positions of the fan section 322, compressor section 324, combustor section 326, turbine section 328, and fan drive gear system 348 may be varied. For example, gear system 348 may be located aft of combustor section 326 or even aft of turbine section 328, and fan section 322 may be positioned forward or aft of the location of gear system 348.

In a non-limiting embodiment, the FIG. 1 gas turbine engine 320 is a high-bypass geared aircraft engine. In a further example, the gas turbine engine 320 bypass ratio is greater than about six (6:1). The geared architecture 348 can include an epicyclic gear train, such as a planetary gear system or other gear system. The example epicyclic gear train has a gear reduction ratio of greater than about 2.3:1, and in another example is greater than about 2.5:1. The exemplary geared architecture transmits driving torque from the low pressure spool to the fan with a geared reduction. The geared turbofan enables operation of the low speed spool 330 at higher speeds, which can increase the operational efficiency of the low pressure compressor 338 and low pressure turbine 339 and render increased pressure in a fewer number of stages. It should be understood, however, that the above parameters are only exemplary of one embodiment of a geared architecture engine and that the present invention is applicable to other gas turbine engines including direct drive turbofans.

In one non-limiting embodiment, the bypass ratio of the gas turbine engine 320 is greater than about ten (10:1), the fan diameter is significantly larger than that of the low pressure compressor 338, and the low pressure turbine 339 has a pressure ratio that is greater than about five (5:1). Low pressure turbine pressure ratio is pressure measured prior to inlet of low pressure turbine 339 as related to the pressure at the outlet of the low pressure turbine 339 prior to an exhaust nozzle. It should be understood, however, that the above parameters are only exemplary of one embodiment of a geared architecture engine and that the present disclosure is applicable to other gas turbine engines, including direct drive turbofans.

In this embodiment of the exemplary gas turbine engine 320, a significant amount of thrust is provided by the bypass flow path B due to the high bypass ratio. In one example, the thrust produced by the fan and core sections of the gas turbine engine 320 is in a range of 27,000-35,000 pounds-f (120,102-156,6888 N). The fan section 322 of the gas turbine engine 320 is designed for a particular flight condition--typically cruise at about 0.8 Mach and about 35,000 feet. This flight condition, with the gas turbine engine 320 at its best fuel consumption, is also known as bucket cruise thrust specific fuel consumption (TSFC). TSFC is an industry standard parameter of fuel consumption per unit of thrust the engine produces at that minimum point.

Fan pressure ratio (FPR) is the pressure ratio across an airfoil of the fan section 322 without the use of a fan exit guide vane (FEGV) system. The low fan pressure ratio according to one non-limiting embodiment of the example gas turbine engine 320 is less than 1.45. Low corrected fan tip speed (LCFTS) is the actual fan tip speed divided by an industry standard temperature correction of $[(\text{Tram }° R)/(518.7° R)]^{0.5}$. The low corrected fan tip speed according to one non-limiting embodiment of the example gas turbine engine 320 is less than about 1150 fps (350 m/s).

Airfoils are used throughout the fan, compressor and turbine sections 340, 338, 328 within the bypass and core flow paths. The airfoils can be supported relative to the engine static structure 336 or spools using a variety of techniques. Turning now to FIG. 3, the fan blade 342 extends in a radial direction, or spanwise, from at least one flow path surface 337, for example, a platform or a shroud, to, for example, a tip 360. A circumferential array of fan blades provide a fan diameter 362, for example, in a range of 77-85 inches (1.8-2.2 m). The fan blade 342 includes an airfoil 364 having leading and trailing edges 366, 368 spaced apart in in a chord-wise direction. The airfoil 364 includes pressure (typically concave) and suction (typically convex) sides spaced apart in an airfoil thickness direction, generally perpendicular to the chord-wise direction, that are joined at the leading and trailing edges 366, 368. The fan blades 342 include roots 370 that are fixedly received and supported in a slotted hub 372.

The airfoil may be formed using any suitable process, for example, casting, forging and/or machining. Any suitable material can be used to provide the airfoil and may be determined based upon factors such as airfoil stresses, engine operating speeds, gas flow dynamics and operating temperatures. In one example, airfoils in the fan section are constructed from an aluminum-based alloy, a titanium-based alloy, and/or a composite fiber material. One example aluminum-based alloy is 7075 with a density of about 0.103 lb/in$^3$ (2.85 g/cm$^3$) and a modulus of elasticity of about 10.4 Mpsi (71 GPa) at room temperature. One example titanium-based alloy is Ti-6Al-4V, which has a density of about 0.16 lb/in$^3$ (4.4 g/cm$^3$) and a modulus of elasticity of about 16-17 Mpsi (110-117 GPa) at room temperature. In one example type of fan blade, a aluminum-based alloy blade body has a titanium-based alloy sheath arranged at a leading edge of the airfoil body. The airfoils may also have a coating system.

A resonant condition is where a frequency of the excitation coincides with a frequency of the airfoil, and may result in high vibratory stress. The airfoil has a number of frequencies that can be resonant at various speeds. There are various modes of vibration, each with its associated natural frequency. As for airfoils, generally six vibratory modes primarily reflect how the airfoils interact with each other, and with other components of the engine. The type (EB, T, SWB, CWB, ND) and number (1, 2, 3, etc.) of the various modes may be ordered interchangeably through this disclosure (e.g., 1EB is the same as EB1).

A first type of mode is easywise bending (EB). An airfoil can be approximated as a cantilevered beam extending in the radial direction for the engine. The easywise bending is parallel to the shortest dimension, or in the thickness direction T.

Figure 3B:
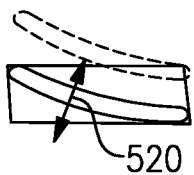
FIG. 3B is an inward view of the airfoil of FIG. 6A with one vibrational extreme shown in broken lines.
Figure 3A:
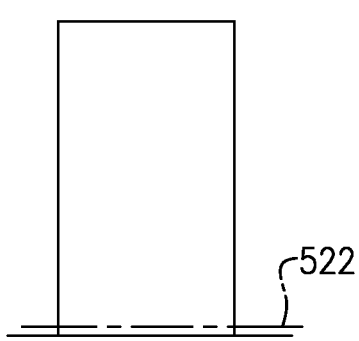
FIG. 3A is a schematic side view of an airfoil showing a first easywise bending mode node line.
Figure 3C:
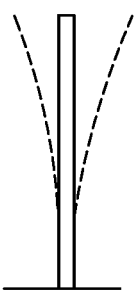
FIG. 3C is a front view of the airfoil of FIG. 6A with both vibrational extremes shown in broken lines.
Figure 3D:
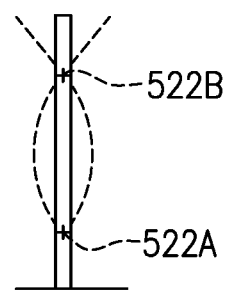
FIG. 3D is a front view of an airfoil with second easywise bending mode extremes shown in broken lines.
Figure 3E:
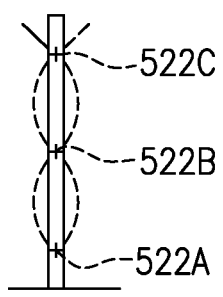
FIG. 3E is a front view of an airfoil with third easywise bending mode extremes shown in broken lines.

FIGS. 3A-3E illustrate various easywise bending modes. FIG. 3B shows bi-directional movement in the direction 520 with a neutral condition that is, without deflection, shown in solid lines. FIG. 3B also shows one of two extremes, that is, with relatively extreme deflection in broken lines. FIG. 3A is a plan view of the airfoil, illustrating node line 522, which is the location of each node in cross sections of the airfoil having deflections illustrated in FIG. 3C. FIG. 3C shows both extremes of EB1 (1EB) movement in broken lines. A first EB mode (EB1 or 1EB; FIG. 3C) is the EB mode of lowest frequency. A second EB mode (2EB or EB2; FIG. 3D) deflection, is a mode that encompasses two node lines 522A and 522B. The mode has one portion of the airfoil moving toward the pressure side and another toward the suction side, changing direction for each cycle of vibration. Note there is no corresponding plan view illustrating the node lines 522A and 522B, though the locations of the two horizontal node lines relative to the airfoil height is readily apparent. EB3 or 3EB (FIG. 3E) is a further EB mode and illustrates three node lines 522A, 522B, and 522C. Other EB modes may exist, and the mode number is indicated by the numeral following "EB."

Figure 4B:
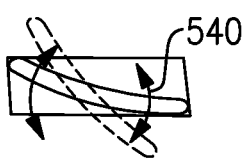
FIG. 4B is an inward view of the airfoil of FIG. 7A, with one torsional extreme shown in broken lines.
Figure 4A:
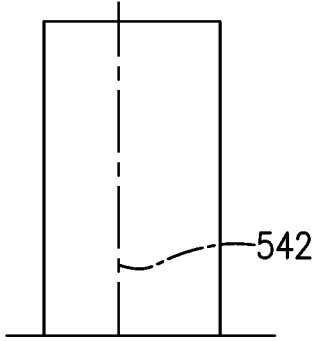
FIG. 4A is a side view of an airfoil showing a torsion mode node line.

The twist or torsion (T) modes (FIGS. 4A and 4B) involve bi-directional twist in direction 540 twist generally about a spanwise axis for the airfoil, which is a radial axis from the center of the airfoil, or node line 542. As with FIG. 4B, one torsional extreme is shown in broken lines with the neutral, deflection free condition shown in solid lines as shown in FIG. 4B. As with EB and other modes, there are a series of torsion modes, including 1T (T1), 2T (T2), etc.

Figure 5B:
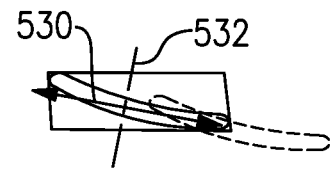
FIG. 5B is an inward view of the airfoil of FIG. 8A with a rearward vibrational extreme shown in broken lines.
Figure 5A:
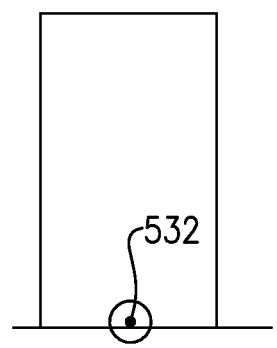
FIG. 5A is a side view of an airfoil showing a first stiffwise bending mode node line.

The stiffwise bending (SWB) modes (FIGS. 5A and 5B) are generally normal to the EB modes in the chordwise direction such that the corners of the airfoil tip at the leading and trailing edges remain in-plane. The SWB resonance frequencies will be higher than the corresponding EB resonance frequencies. As with FIG. 3B, FIG. 3B shows bi-directional movement in a direction 530 with one extreme (a trailing-edge shifted extreme) shown in broken lines relative to a solid line neutral position. The node line is shown as 532. As with EB and other modes, there are a series of stiffwise bending modes, including 1SWB (SWB1), 2SWB (SWB2), etc.

There are other modes as well. The chordwise bending (CWB) mode are where the corners of the airfoil tip at the leading and trailing edges vibrate out-of-plane in the same direction at the same time. As with EB and other modes, there are a series of chordwise bending modes, including 1CWB (CWB1), 2CWB (CWB2), etc. Trailing edge bending (TEB) modes are bending modes that bend primarily along the trailing edge, and leading edge bending (LEB) modes are bending modes that bend primarily along the leading edge. Some modes may be a more complex combination of bending and torsion such that the complex mode (M) cannot be characterized as one mode. The first mode has the lowest frequency, and the second mode has the second lowest frequency. As a general matter, however, the lowest resonance frequency is expected to be that of the EB1 mode. In the example fan blade, the second mode has a bending or EB2 component. The remaining details of airfoil configuration may influence the relative positioning of the remaining modes.

The above frequencies relate primarily to the airfoils. The frequencies also include the effects of a root, platform, rim, disk and/or rotor. In the case of an array with an asymmetrical arrangement of airfoils, the above frequencies represent an average of the frequencies of the different airfoils. For the engine using the disclosed example fan blade, exemplary running speeds for the fan 342 are: idle speed is 500-600 rpm; min. cruise speed is 2500-2900 rpm; and redline speed is 3100-3500 rpm.

While frequencies are a function of the airfoil length, stiffness, and mass, they also represent the unique design characteristic of the airfoil. During the airfoil design, the resonance frequencies may be modified by selective modification of the airfoil root stiffness, length, chord, external thickness, or internal features (such as but not limited to rib location/thickness, or wall thickness, etc.). Any changes to the resonance frequencies could render the airfoil unacceptable for continued operation in the field without high vibratory stresses which can result in high cycle fatigue cracking. One skilled in vibration analysis and design would understand that these resonance frequency characteristics are unique for each airfoil and should account for, for example, the specific operational vibratory environment. The frequencies are determined using computer modelling, for example, ANSYS, although the frequencies may be measured experimentally.

Figure 6:
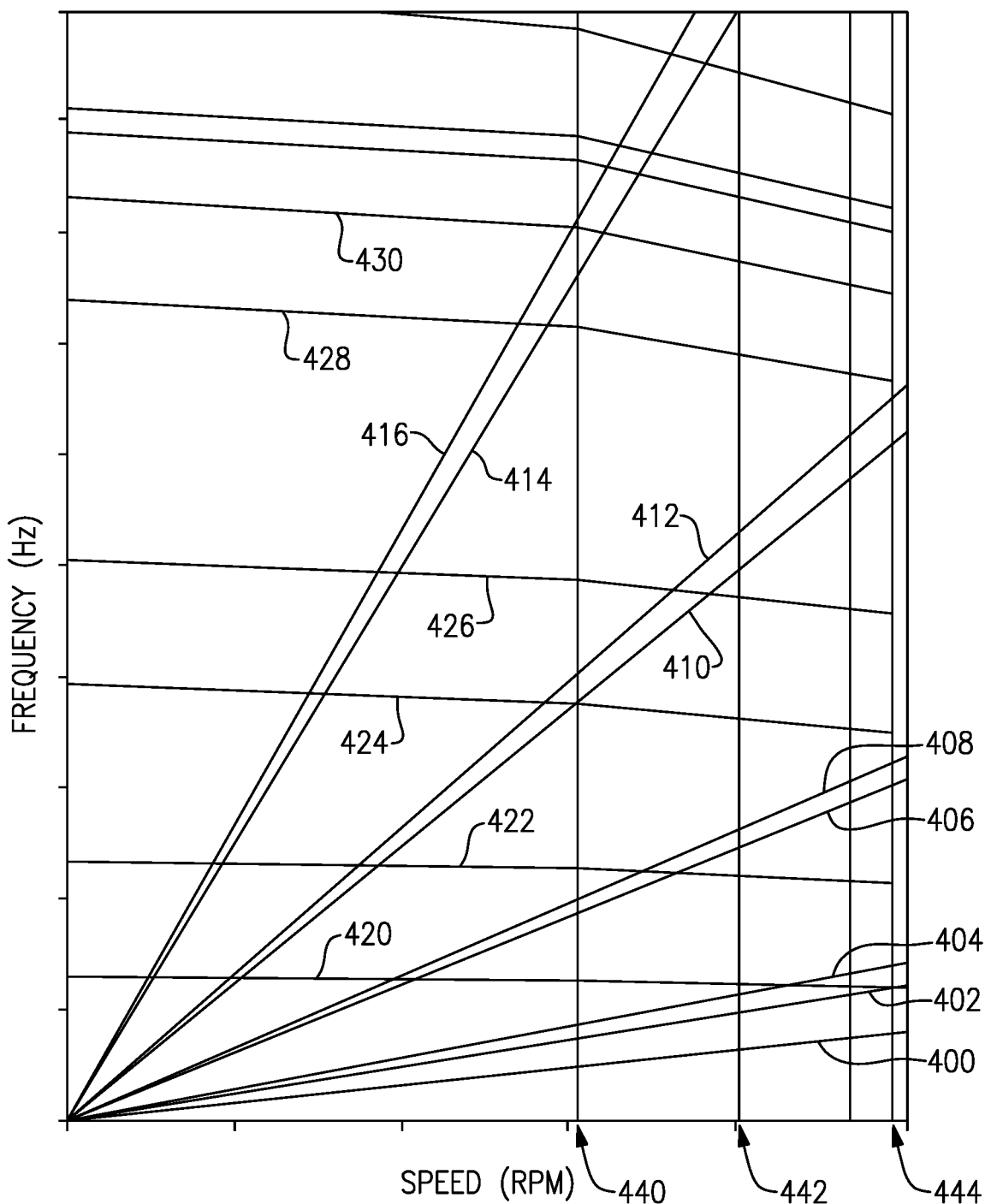
FIG. 6 is a Campbell diagram of an airfoil.

FIG. 6 is a Campbell diagram, with frequency and rotational speed on the axes, which plots the resonant frequencies for the airfoil against engine rotor speed. That is, the Campbell diagram illustrates the unique frequency characteristics of the airfoil and captures the vibratory resonance of the airfoil. The modal frequencies change with speed because of the increased temperature (reducing frequency) and centrifugal stiffening (increasing the frequency). The frequencies (which, as indicated, are unique for each airfoil) are represented by essentially horizontal lines 420, 422, 424, 426, 428, and 430. These illustrate, against the engine rotor speed, the frequency of the 1st easy-wise bending (1EB), 1st stiff-wise bending (SWB), 1st torsion (1T), 2nd easy-wise bending (2EB), 2nd torsion (2T), and 2nd trailing edge bending (2TEB) vibratory modes, or any other modes relevant to the airfoil. However, the sequence of the modes or type of mode varies and may be different for each airfoil. The Campbell diagram has angled lines 400, 402, 404, 406, 408, 410, 412, 414, and 416. These angled lines, called excitation orders, represent the excitation from upstream and downstream stationary airfoils or other interruptions in the flowpath that the airfoil feels as it rotates past the stationary airfoils.

For example, lines 400, 402, and 404 may be components of a once per revolution excitation. The airfoils can feel this excitation for excitation orders 1E, 2E, 3E, 4E, and 5E. Lines 400, 402, and 404, represent 4E, 6E, and 7E, respectively. In any flowpath, there are general aerodynamic disturbances which the airfoils feel at multiples of the rotor spin frequency. 1E is one excitation per revolution or the rotor spin frequency (in cycles per second). The airfoils feel multiples of this once per revolution.

As illustrated for the airfoil, the 6E (402), and 7E (404) excitation orders are plotted on the Campbell diagram and are a potential concern because there are resonance crossings with the first bending mode (line 420) at high speed. The 4E line (line 400) does not have a crossing and is of less significance.

In addition, lines 410 and 412 respectively are excitation functions that are proportional to the vane counts of the vane stages immediately upstream and downstream of the airfoil stage in question. Lines 414 and 416 are twice 410 and 412 excitations and are relevant to Fourier decomposition of excitations. Lines 406 and 408 are proportional to counts of downstream struts (which are big structural airfoils that are part of the bearing supports; in this example, the strut count is different on two halves of the engine circumference).

Where the resonance frequency lines (represented by lines 420, 422, 424, 426, 428, and 430) intersect the excitation lines (represented by the angled lines 400, 402, 404, 406, 408, 410, 412, 414, and 416) a resonant condition occurs, which, as indicated, may result in high vibratory stress. The present airfoil characteristics have been designed such that vibratory modes, which may result in high vibratory stresses at a resonant condition, are avoided. Accordingly, the modes do not occur in the normal engine operating speed range (near idle (line 440)) and between minimum engine cruise (line 442) and redline (line 444). Vibratory modes, which are not predicted to have a high resonance response, are allowed to have a resonance condition in the normal operating range. As indicated, these evaluations may account for some or more of flowpath temperature and pressure, airfoil length, speed, etc. As a result, the evaluation and the subsequent iterative redesign of the airfoil is an airfoil which is unique for a specific engine in a specific operating condition.

During the design, the airfoil must be tuned such that the resonance points do not occur in the operating speed range of the engine for critical modes. To tune the airfoil, the resonance frequency must be changed, for example, by varying the airfoil length thickness, moment of inertia, or other parameters. These parameters are modified until the graphical intersections representing unwanted resonance occur outside the operating speed range, or at least outside key operating conditions within the operating speed range. This should be done for each the first four (or more) vibratory modes of the airfoil (1EB, 1T, 1CWB, 1SWB), and the airfoil should be tuned for varying excitation sources.

In FIG. 6, the idle speed is shown as 440, the minimum cruise speed is shown as 442, and the redline speed is shown as 444. Idle speed is important because the engine spends much time at idle. Tuning out resonance at min cruise and redline speeds are important because engines typically cannot avoid these speeds. A resonance at an excitation frequency at an intermediate speed may be avoided by slightly increasing or decreasing speed.

As an example from FIG. 6, it is seen that there are two resonance conditions. That is, the 1st stiff-wise bending resonance mode (line 422) crosses two excitation lines, which are lines 406 and 408. These two resonance conditions occur between the engine idle speed (line 440) and the engine minimum cruise speed (line 442). It should be understood that regardless of the particular mode, it is desirable to design an airfoil that at least avoids resonance at speed lines 440 and 442. Resonance between lines 440 and 442 is an acceptable location for a resonance to occur and is unique for this airfoil in this engine.

In order to maintain a sufficiently light fan blade 342 that also provides sufficient stiffness and bird-strike capability, the second mode is 140 Hz or less at a redline speed. In one example embodiment, the second mode frequency is in a range of 100-140 Hz. In another example embodiment, the second mode frequency is in a range of 100-120 Hz, which includes a range of 100-110 Hz and a range of 110-120 Hz. In another embodiment, the second mode frequency is in a range of 120-140 Hz, which includes a range of 120-130 Hz and a range of 130-140 Hz.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A turbofan engine comprising: a fan section, wherein the fan section includes a hub: a core section includes a turbine section arranged fluidly downstream from the compressor section, a combustor arranged fluidly between the compressor and turbine sections, the fan and core sections configured to produce a thrust in a range 27,000-35,000 pounds-f (120,102-156,688 N); and an airfoil is fixedly supported in the hub in a dovetail arrangement, wherein the fan section has a circumferential array of the airfoil, the array providing a fan diameter in a range of 77-85 inches (1.8-2.2 m), the airfoil having first and second modes each having a frequency, the first mode has the lowest frequency, the second mode has an easywise bending component and has the second lowest frequency, the hub and the airfoil providing the first and second modes, and the second mode frequency is configured to be in a range of 100-140 Hz at a redline fan speed of 3100-3500 rpm, wherein the airfoil comprises an aluminum-based alloy with a density of 0.103 lb/in3 (2.85 g/cm3) and with a modulus of elasticity of 10.4 Mpsi (71 GPa) at room temperature.

2. The engine of claim 1, comprising a gear train rotationally coupling the turbine section and the fan section, wherein the compressor section is arranged fluidly downstream from the fan section.

3. The engine of claim 1, wherein the airfoil includes an aluminum-based alloy blade body with a titanium-based alloy sheath at a leading edge on the airfoil body.

4. A turbofan engine comprising: a fan section, wherein the fan section includes a hub: a core section includes a turbine section arranged fluidly downstream from the compressor section, a combustor arranged fluidly between the compressor and turbine sections, the fan and core sections configured to produce a thrust in a range 27.000-35.000 pounds-f (120.102-156.688 N): and an airfoil is fixedly supported in the hub in a dovetail arrangement, wherein the fan section has a circumferential array of the airfoil, the array providing a fan diameter in a range of 77-85 inches (1.8-2.2 m), the airfoil having first and second modes each having a frequency, the first mode has the lowest frequency, the second mode has an easywise bending component and has the second lowest frequency, the hub and the airfoil providing the first and second modes and the second mode frequency is configured to be in a range of 100-140 Hz at a redline fan speed of 3100-3500 rpm, wherein the airfoil comprises an titanium-based alloy with a density of 0.16 lb/in3 (4.4 g/cm3) and with a modulus of elasticity of 16-17 Mpsi (110-117 GPa) at room temperature.

5. A turbomachine airfoil configured to be mounted on a hub in a fan section of a turbomachine configured to produce a thrust in a range 27,GOO-35,000 pounds-f (120,102-156, 688 N), wherein fan section has a circumferential array of the airfoils, the array providing a fan diameter in a range of 77-85 inches (1.8-2.2 m), the airfoil comprising: first and second modes each having a frequency, the first mode has the lowest frequency, the second mode has the second lowest frequency, wherein the second mode has an easywise bending component, and the second mode frequency is configured to be in a range of 100-140 Hz at a redline fan speed of 3100-3500 rpm and an engine operating temperature at a cruising altitude of 35,000 feet, and wherein the turbomachine airfoil comprises an aluminum-based alloy with a density of 0.103 lb/in3 (2.85 g/cm3) and with a modulus of elasticity of 10.4 Mpsi (71 GPa) at room temperature.

6. The engine of claim 5, wherein the second mode frequency is in a range of 100-120 Hz.

7. The engine of claim 6, wherein the second mode frequency is in a range of 100-110 Hz.

8. The engine of claim 6, wherein the second mode frequency is in a range of 110-120 Hz.

9. The engine of claim 5, wherein the second mode frequency is in a range of 120-140 Hz.

10. The engine of claim 9, wherein the second mode frequency is in a range of 120-130 Hz.

11. The engine of claim 9, wherein the second mode frequency is in a range of 130-140 Hz.

12. The engine of claim 4, comprising a gear train rotationally coupling the turbine section and the fan section, wherein the compressor section is arranged fluidly downstream from the fan section.

13. The engine of claim 5, wherein the airfoil comprises a composite material.

\* \* \* \* \*